(12) United States Patent
Nardi et al.

(10) Patent No.: US 11,484,943 B2
(45) Date of Patent: Nov. 1, 2022

(54) ADDITIVE MANUFACTURING OF METAL MATRIX COMPOSITE FEEDSTOCK

(71) Applicant: United Technologies Corporation, Farmington, CT (US)

(72) Inventors: Aaron T. Nardi, East Granby, CT (US); Zissis Dardas, Worcester, MA (US); James T. Beals, West Hartford, CT (US); Wayde R. Schmidt, Pomfret Center, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1003 days.

(21) Appl. No.: 15/112,042

(22) PCT Filed: Jan. 23, 2015

(86) PCT No.: PCT/US2015/012734
§ 371 (c)(1),
(2) Date: Jul. 15, 2016

(87) PCT Pub. No.: WO2015/112889
PCT Pub. Date: Jul. 30, 2015

(65) Prior Publication Data
US 2016/0339518 A1 Nov. 24, 2016

Related U.S. Application Data

(60) Provisional application No. 61/930,530, filed on Jan. 23, 2014.

(51) Int. Cl.
*B22F 1/16* (2022.01)
*C22C 32/00* (2006.01)
(Continued)

(52) U.S. Cl.
CPC ............... *B22F 1/16* (2022.01); *B22F 10/20* (2021.01); *B23K 9/04* (2013.01); *B23K 9/23* (2013.01);
(Continued)

(58) Field of Classification Search
CPC .......... B33Y 10/00; B33Y 70/00; B33Y 80/00
(Continued)

(56) References Cited

U.S. PATENT DOCUMENTS

| 4,569,821 A | 2/1986 | Duperray et al. |
| 5,009,591 A | 4/1991 | Watanabe |

(Continued)

FOREIGN PATENT DOCUMENTS

EP 3092096 A1 11/2016

OTHER PUBLICATIONS

EPO Official Letter dated Jan. 14, 2019 for Application No. 15740032.6.

(Continued)

*Primary Examiner* — Joel M Attey
*Assistant Examiner* — Alba T Rosario-Aponte
(74) *Attorney, Agent, or Firm* — Getz Balich LLC

(57) ABSTRACT

A feedstock for an additive manufacturing process includes a pre-ceramic polymer intermixed with a base material. A method of additive manufacturing includes melting and pyrolizing a feedstock containing metal and a pre-ceramic polymer. An article of manufacture includes an additive manufacturing component including a pyrolized feedstock.

16 Claims, 2 Drawing Sheets

(51) Int. Cl.

| | | |
|---|---|---|
| *B29C 64/153* | (2017.01) | |
| *B22F 10/20* | (2021.01) | |
| *B33Y 10/00* | (2015.01) | |
| *B33Y 70/00* | (2020.01) | |
| *B33Y 80/00* | (2015.01) | |
| *B23K 26/342* | (2014.01) | |
| *B23K 9/04* | (2006.01) | |
| *B23K 9/23* | (2006.01) | |
| *B23K 10/02* | (2006.01) | |
| *B23K 15/00* | (2006.01) | |
| *B23K 26/00* | (2014.01) | |
| *B23K 35/02* | (2006.01) | |
| *B23K 35/36* | (2006.01) | |
| *B23K 103/16* | (2006.01) | |
| *B29K 105/00* | (2006.01) | |
| *B29K 505/00* | (2006.01) | |

(52) U.S. Cl.
CPC ........ *B23K 10/027* (2013.01); *B23K 15/0086* (2013.01); *B23K 15/0093* (2013.01); *B23K 26/0006* (2013.01); *B23K 26/342* (2015.10); *B23K 35/0255* (2013.01); *B23K 35/0261* (2013.01); *B23K 35/3613* (2013.01); *B29C 64/153* (2017.08); *B33Y 10/00* (2014.12); *B33Y 70/00* (2014.12); *B33Y 80/00* (2014.12); *C22C 32/00* (2013.01); *B23K 2103/16* (2018.08); *B29K 2105/251* (2013.01); *B29K 2505/00* (2013.01); *Y02P 10/25* (2015.11)

(58) Field of Classification Search
USPC ........................................ 219/76.12; 264/497
See application file for complete search history.

(56) References Cited

U.S. PATENT DOCUMENTS

| | | | |
|---|---|---|---|
| 5,139,818 A | 8/1992 | Mance | |
| 5,227,365 A | 7/1993 | Van den Sype | |
| 5,512,330 A | 4/1996 | Dearnaley | |
| 5,545,798 A | 8/1996 | Elliott | |
| 5,801,073 A * | 9/1998 | Robbins | H01L 21/50 257/E21.499 |
| 5,834,840 A * | 11/1998 | Robbins | H01L 21/4807 257/705 |
| 5,904,762 A | 5/1999 | Mahmud et al. | |
| 6,057,387 A | 5/2000 | Mahmud et al. | |
| 6,206,941 B1 | 3/2001 | Du Plessis | |
| 6,398,991 B1 * | 6/2002 | Brazil | C04B 35/573 264/29.1 |
| 7,534,388 B2 * | 5/2009 | Pujari | C04B 35/565 264/661 |
| 7,931,962 B1 | 4/2011 | Willcockson et al. | |
| 8,575,513 B2 | 11/2013 | Abdo et al. | |
| 9,102,571 B2 | 8/2015 | Szewda et al. | |
| 2002/0035026 A1 * | 3/2002 | Greil | C04B 35/14 501/88 |
| 2010/0279007 A1 | 11/2010 | Briselden et al. | |
| 2013/0008879 A1 * | 1/2013 | Bichsel | B22F 3/1055 219/121.14 |
| 2014/0163717 A1 * | 6/2014 | Das | B22F 3/1055 700/119 |
| 2015/0328719 A1 * | 11/2015 | Jarvis | B23K 1/0053 219/76.12 |
| 2015/0362898 A1 * | 12/2015 | Potter | G05B 19/4099 700/98 |
| 2016/0043250 A1 * | 2/2016 | Smith | H01L 31/02366 136/255 |
| 2016/0107331 A1 | 4/2016 | Schmidt | |
| 2016/0221262 A1 * | 8/2016 | Das | G03F 7/70416 |

OTHER PUBLICATIONS

Kevin Jakubenas et al: "Silicon Carbide from Laser Pyrolysis of Polycarbosilane", Journal of the American Ceramic Society, vol. 78, No. 8, Aug. 1, 1995 (Aug. 1, 1995), pp. 2263-2266, XP055201359, US, ISSN: 0002-7820, DOI: 10.1111/j.1151-2916.1995.tb08653.x.

Andrea Zocca et al: "SiOC ceramics with ordered porosity by 3D-printing of a preceramic polymer", Journal of Materials Research, vol. 28, No. 17, May 23, 2013 (May 23, 2013), pp. 2243-2252, XP055201305, ISSN: 3884-2914, doi: 10.1557/JMR.2013.129.

Seyferth D et al: "Application of Preceramic Polymers in Powder Metallurgy: Their Use as Low-Loss Binders and for the in Situ Formation of Dispersed Ceramic Phases in the Metal Matrix", Chemistry of Materials, American Chemical Society, vol. 6, No. 1, Jan. 1, 1994 (Jan. 1, 1994), pp. 10-12, XP000479941, ISSN: 0897-4756, DOI: 10.1021/CM00037A003.

S. Shamsuddin et al: "Influence of Binder in Iron Matrix Composites", AIP Conference Proceedings, Jan. 1, 2010 (Jan. 1, 2010), pp. 419-423, XP055539563, New York, US, ISSN: 0094-243x, DOI: 10.1063/1.3377856.

EP office action for EP15740032.6 dated Mar. 19, 2018.

Zocca et al. "SiOC Ceramics with Ordered Porosity by 3D-Printing of a Preceramic Polymer", J. Mater. Res. vol. 28, No. 17, Sep. 14, 2013, pp. 2243-2252.

Hyun-Soo et al. "Synthesis of Ceramics via Pyrolysis of Preceramic Polymers", J. of Korean Ind. & Eng. Chemistry, vol. 4, No. 4, Dec. 1993, pp. 639-652.

Jakubenas et al. "Silicon Carbide from Laser Pyrolysis of Polycarbosilane", Journal of the American Ceramic Society, vol. 78, No. 8, Aug. 1, 1995, pp. 2263-2266.

Zocca et al. "SiOC Ceramics with Ordered Porosity by 3D-Printing of a Preceramic Polymer", Journal of Materials Research, vol. 28, No. 17, May 23, 2013, pp. 2243-2252.

EP search report for EP15740032.6 dated Jan. 23, 2017.

Renliang et al. "Comparison of Sizing Small Particles Using Different Technologies", Powder Technology, vol. 132, No. 2-3, Jun. 24, 2003, pp. 145-153.

Office action for EP15740032.6 dated Feb. 22, 2021.

* cited by examiner

ADDITIVE MANUFACTURING OF METAL MATRIX COMPOSITE FEEDSTOCK

CROSS-REFERENCE TO RELATED APPLICATION

This application claims priority to PCT Patent Application No. PCT/US15/012734 filed Jan. 23, 2015 which claims priority to U.S. Patent Application No. 61/930,530 filed Jan. 23, 2014, which is are hereby incorporated herein by reference in its entirety their entireties.

BACKGROUND

The present disclosure relates generally to additive manufacturing, and more particularly to a feedstock therefor that includes a pre-ceramic polymer.

Laser Powder Bed Fusion (LPBF) is an additive manufacturing process involving the construction of a three-dimensional article by selectively projecting a laser beam having the desired energy onto a layer of feedstock particles. When coupled with computer aided design apparatus, LPBF is an effective technique for producing prototype as well as production articles. Other such additive manufacturing processes utilize an electron beam within a vacuum.

Various nanoparticles have heretofore been included in feedstock, but proper mixing and distribution of the particles in a bulk feedstock have been difficult to achieve.

SUMMARY

A feedstock for an additive manufacturing process, according to one disclosed non-limiting embodiment of the present disclosure, includes a pre-ceramic polymer intermixed with a base material.

In a further embodiment of the present disclosure, the pre-ceramic polymer coats the base material.

In a further embodiment of any of the foregoing embodiments of the present disclosure, the feedstock has a particle size in a range of 5 to 200 microns.

In a further embodiment of any of the foregoing embodiments of the present disclosure, the base material is an agglomerate with the pre-ceramic polymer.

In a further embodiment of any of the foregoing embodiments of the present disclosure, the feedstock has a particle size in a range of 10 to 200 microns.

In a further embodiment of any of the foregoing embodiments of the present disclosure, a binder is intermixed with the base material and the pre-ceramic polymer.

In a further embodiment of any of the foregoing embodiments of the present disclosure, the binder is poly vinyl alcohol.

In a further embodiment of any of the foregoing embodiments of the present disclosure, the base material is dipped within the pre-ceramic polymer.

In a further embodiment of any of the foregoing embodiments of the present disclosure, the feedstock forms a powder.

In a further embodiment of any of the foregoing embodiments of the present disclosure, the feedstock forms a wire.

In a further embodiment of any of the foregoing embodiments of the present disclosure, the pre-ceramic polymer forms a volumetric ratio of about 1% to 50%.

In a further embodiment of any of the foregoing embodiments of the present disclosure, the pre-ceramic polymer forms a volumetric ratio of about 1% to 10%.

A method of additive manufacturing, according to another disclosed non-limiting embodiment of the present disclosure, includes melting and pyrolizing a feedstock containing metal and a pre-ceramic polymer.

In a further embodiment of any of the foregoing embodiments of the present disclosure, the pyrolizing is effected via at least one of a laser, an electron beam, an arc heat source and/or a plasma heat source.

In a further embodiment of any of the foregoing embodiments of the present disclosure, the pyrolizing is effected with a melt-solidification process that forms a melt pool.

In a further embodiment of any of the foregoing embodiments of the present disclosure, the feedstock is blown into the heat source.

In a further embodiment of any of the foregoing embodiments of the present disclosure, the feedstock is in a powder bed process.

In a further embodiment of any of the foregoing embodiments of the present disclosure, the feedstock is a wire fed into the heat source.

An article of manufacture, according to another disclosed non-limiting embodiment of the present disclosure, includes an additive manufacturing component including a pyrolized feedstock.

In a further embodiment of any of the foregoing embodiments of the present disclosure, the additive manufacturing component includes a metal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
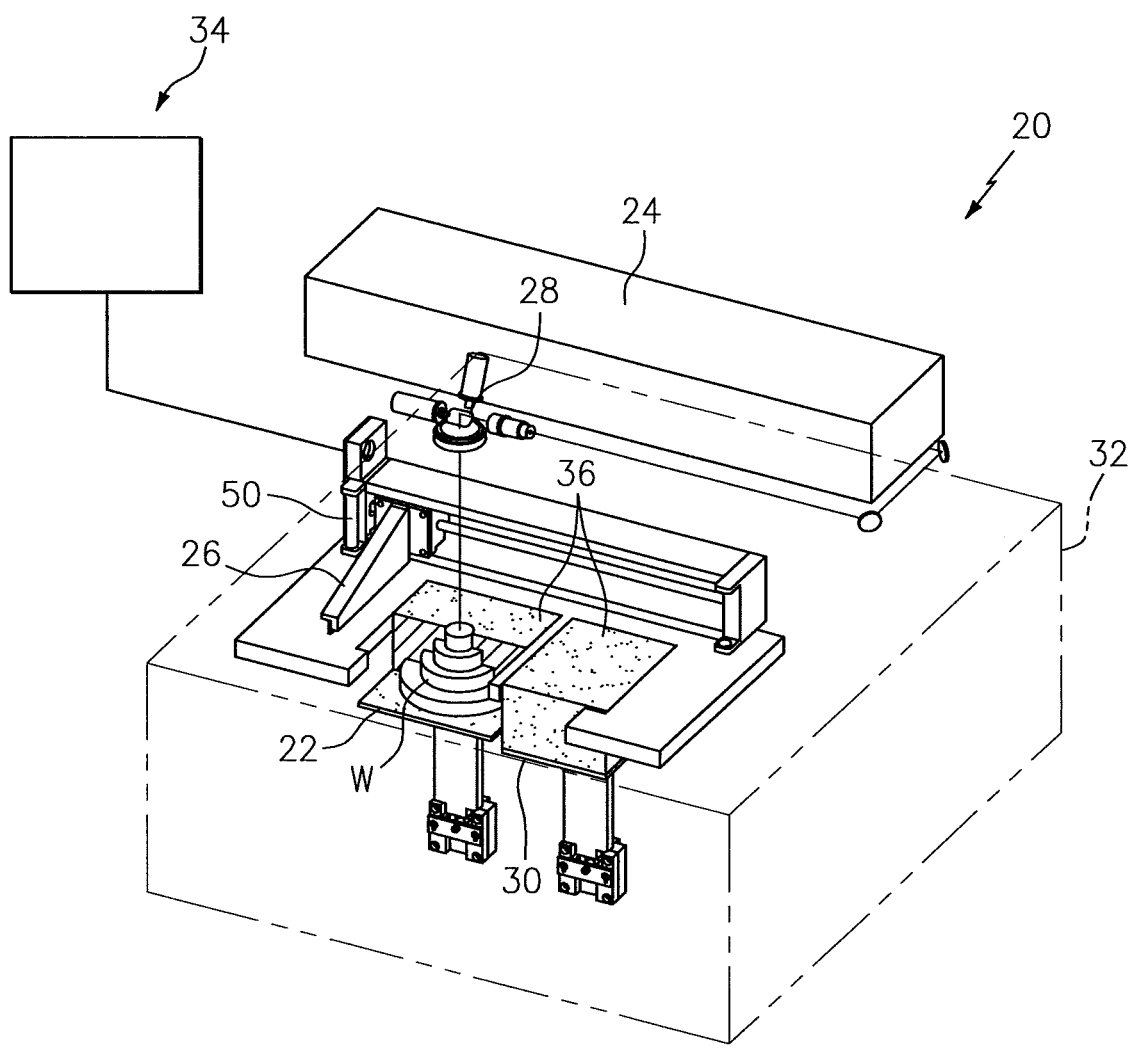
FIG. 1 is a schematic view of one example additive manufacturing system.

FIG. 1 schematically illustrates an additive manufacturing system 20. Example additive manufacturing systems 20 include, but are not limited to, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Direct Metal Laser Sintering (DMLS) and others.

The system 20 generally includes a build platform 22, a laser 24, a rigid recoater blade system 26, a scanner head 28, a dispenser platform 30, a build chamber 32 and a control 34. It should be appreciated that various components and subsystems may additionally or alternatively provided. The additive manufacturing process essentially "grows" articles from three-dimensional information, for example, a three-dimensional computer aided design (CAD) model. The three-dimensional information is converted into a plurality of slices, where each slice defines a cross section of the article for a predetermined height of the slice. The additive manufactured component is then "grown" slice by slice, or layer by layer, until finished.

The build platform 22 and the dispenser platform 30 are contained within the build chamber 32 that is closed hermetically to receive an inert gas to avoid unwanted reactions of a melt pool formed from a feedstock 36. The build chamber 32 also includes a window through which the laser beam from the laser 24 may pass to selectively melt the feed stock 36. An example laser 24 includes a $CO_2$ laser that can operate in a continuous mode at a wavelength of approximately 10590 nm, which is infrared. However, other melt systems such as electron beam will also benefit herefrom. The laser 24 is selectively controlled via the control 34 and in accordance with a CAD file containing detailed dimensions of the desired article and its associated cross-sections.

In general, operation according to one disclosed non-limiting embodiment distributes the feedstock 36 to the build platform 22 from the dispenser platform 30 by the recoater blade 26 in response to the control 34. The build-up or "growth" of the article of manufacture W is directed in a layer-by-layer manner within the feedstock 36. That is, a computer file of the article of manufacture W is sliced into discrete layers having a certain thickness, which cumulatively folio, the three-dimensional configuration of the article of manufacture W. Each layer includes an essentially two-dimensional cross-sectional contour of the article of manufacture W.

Figure 2:
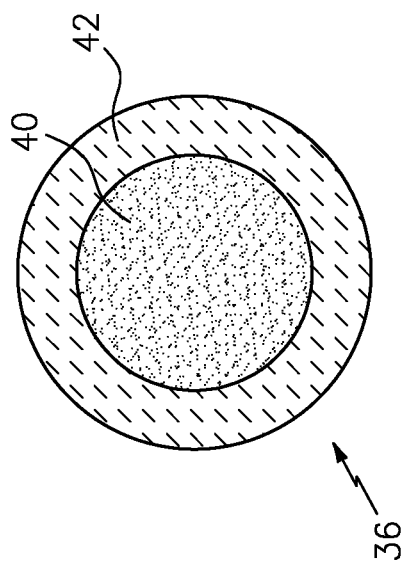
FIG. 2 is a schematic cross-section of a feedstock for an additively manufactured article of manufacture according to one disclosed non-limiting embodiment.

In one disclosed non-limiting embodiment, the feedstock 36 is formed of a pre-ceramic polymer 40 and a base material 42 (see FIG. 2). The pre-ceramic polymer 40 includes but is not limited to materials such as silicon carbide, silicon nitride and others that are temperature tailored to the desired temperature tailored base material 42. That is, the pre-ceramic polymer 40 is selected to pyrolize at a temperature conducive to the melt pool temperature of the base material 42. For example, a pre-ceramic polymer 40 that pyrolizes at a relatively higher temperature may be utilized with base material 42 that melts at a higher temperature such as nickel while a pre-ceramic polymer 40 that pyrolizes at a relatively lower temperature may be utilized with base material 42 that melts at a relatively lower temperature such as aluminum. It should be appreciated that the polymer may be added into a molten metal, such that the heat of the melt pyrolyzes the polymer into a ceramic phase, then the metal freezes with that secondary phase incorporated. The polymer may alternatively or additionally be reacted through outside heating such as a furnace, laser, electron beam, arc heat source, plasma heat source or other heat source. The pyrolyzed polymer that results may then be crushed or otherwise converted into a powder that can then be milled, spray dried, granulated, or otherwise combined with the metal to provide the feedstock 36. The feedstock 36 may include the pre-ceramic polymer 40 at a volumetric ratio of about 1% to 50% and preferably about 1% to 10%.

Although the feedstock 36 is primarily described herein as a granulated powder typically utilized as a powder bed process or a laser applied powder process, it should be appreciated that other forms of feedstock 36 that includes but are not limited to, wire, strip or others as are often utilized in a laser and/or electron beam wire deposition process will also benefit herefrom. In addition, the base material 42 includes but is not limited to, metals such as 625 Alloy, 718 Alloy, 230 Alloy, stainless steel, tool steel, cobalt chrome, titanium, nickel, aluminum and others in atomized powder material form. Alloys such as 625, 718 and 230 may be used for articles of manufacture that operate in high temperature environments, such as those, for example, that are typically encountered by aerospace and gas turbine engine components.

In one disclosed non-limiting embodiment, the pre-ceramic polymer 40 coats the base material 42 and defines a particle size in the range of 5 to 200 microns (see FIG. 2). The pre-ceramic polymer 40 may coat the base material 42 via spray drying, coating, or other applicable method. Additionally, wire or strip could be coated or cored to have the same effect on wire additive processes such as laser applied or electron beam applied wire processes.

Figure 3:
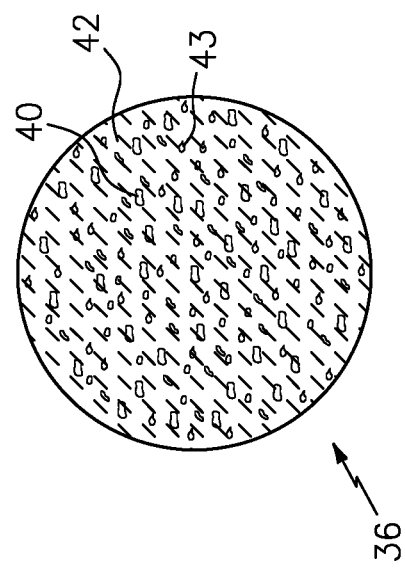
FIG. 3 is a schematic cross-section of a feedstock for an additively manufactured article of manufacture according to one disclosed non-limiting embodiment.

In another disclosed non-limiting embodiment, the pre-ceramic polymer 40 forms an agglomerate with the base material 42 of about 10-200 microns (see FIG. 3). The agglomerate may also include a binder 43 such as a poly vinyl alcohol or others. It should also be appreciated that the pre-ceramic polymer 40 may be blended with the base material 42 for applicability in graded articles of manufacture W.

The rigid recoater blade system 26 is driven to sweep and spread a portion of the feedstock 36 on the build platform 22 from the raised dispenser platform 30. Corresponding to the first cross-sectional region of the article of manufacture W, the control 34 controls the laser beam to selectively scan the deposited feedstock 36 within the confines of the defined boundaries of that layer. The laser beam heats the powder so as to form a melt pool typically about 0.5-1 mm in size such that the feedstock 36 is joined together for that layer.

After the laser 24 has processed each layer, the recoater blade 26 again distributes fresh feedstock 36 onto the build platform 22 from the raised dispenser platform 30 and over the partially grown article of manufacture W, which is lowered so as to correspond to the layer thickness that is to be next applied. That is, the rigid recoater blade system 26 can move back and forth to deliver the feedstock 36 from the dispenser platform 30 to the build platform 22 and level the powder surface of the feedstock 36.

The feedstock 36 of pre-ceramic polymer 40 and the base material 42 is utilized within the additive manufacturing process such that as the feedstock 36 is incorporated in the melt pool, and/or reacts with the melt pool, such that the feedstock 36 forms desirable secondary phases and the pre-ceramic polymer is pyrolized to form well dispersed fine precipitates in the microstructure of the base material 42. These precipitates do not pile up as has been a problem when adding nano-particles directly to a melt pool but may not be evenly dispersed throughout the metal matrix composite (MMC) article of manufacture W. Nonetheless, the MMC article of manufacture W with pyrolized pre-ceramic polymer 40 has been found to lead to advantageous graded properties. That is, selective incorporation of feedstock 36 of pre-ceramic polymer 40 and the base material 42 facilities the ability to grade properties within an added manufacture article of manufacture to produce exceptional properties.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of additive manufacturing comprising:
   providing a plurality of feedstock particles, each feedstock particle of the plurality of feedstock particles comprising an agglomerate of a base material, a pre-ceramic polymer and a binder intermixed with the base material and the pre-ceramic polymer, the base material comprising metal, and the binder comprising a poly vinyl alcohol;
   melting and pyrolyzing the plurality of feedstock particles; and
   forming a metal matrix composite article from the melted and the pyrolyzed feedstock particles.

2. The method as recited in claim 1, wherein the melting and the pyrolyzing is effected by at least one of a laser, an electron beam, an arc heat source or a plasma heat source.

3. The method as recited in claim 1, wherein the plurality of feedstock particles are blown into a heat source.

4. The method of claim 1, wherein each feedstock particle has a size in a range of 10-200 microns.

5. The method of claim 1, wherein the pre-ceramic polymer in each feedstock particle has a volumetric ratio of 1% to 50%.

6. The method of claim 1, wherein the pre-ceramic polymer in each feedstock particle has a volumetric ratio of 1% to 10%.

7. The method of claim 1, wherein the metal comprises nickel.

8. The method of claim 1, wherein the pre-ceramic polymer comprises silicon carbide.

9. The method of claim 1, wherein the pre-ceramic polymer comprises silicon nitride.

10. A method of additive manufacturing comprising:
    providing feedstock material, the feedstock material comprising an agglomerate including a base material, a pre-ceramic polymer and a binder intermixed with the base material and the pre-ceramic polymer, and the base material comprising metal; and
    melting and pyrolyzing the feedstock material to form a metal matrix composite article.

11. The method of claim 10, wherein the binder comprises a poly vinyl alcohol.

12. The method of claim 10, wherein the feedstock material comprises a plurality of particles, and one of the plurality of particles comprises the agglomerate.

13. The method of claim 10, wherein the melting and the pyrolyzing is performed using a laser.

14. The method of claim 10, wherein the melting and the pyrolyzing is performed using an electron beam.

15. The method of claim 10, wherein the melting and the pyrolyzing is performed using an arc heat source.

16. The method of claim 10, wherein the melting and the pyrolyzing is performed using a plasma heat source.

* * * * *